Patented Apr. 24, 1923.

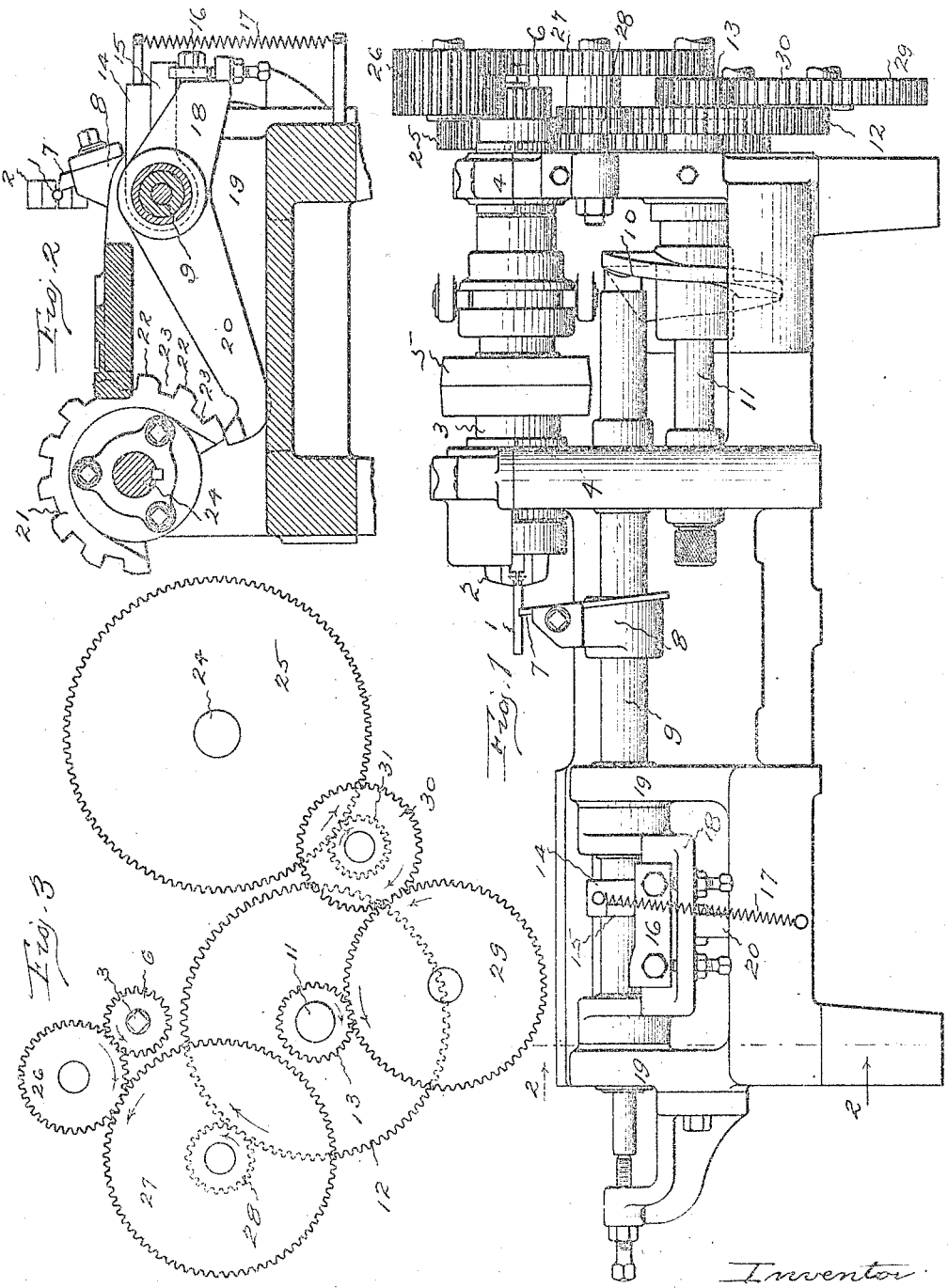

1,452,986

UNITED STATES PATENT OFFICE.

HENRY L. SMITH, OF WATERBURY, CONNECTICUT, ASSIGNOR TO THE E. J. MANVILLE MACHINE COMPANY, OF WATERBURY, CONNECTICUT, A CORPORATION OF CONNECTICUT.

OPERATING MECHANISM FOR WOOD-SCREW MACHINES.

Application filed January 2, 1922. Serial No. 526,484.

*To all whom it may concern:*

Be it known that I, HENRY L. SMITH, a citizen of the United States, residing at Waterbury, in the county of New Haven and State of Connecticut, have invented a new and useful Improvement in Operating Mechanism for Wood-Screw Machines, of which the following is a specification.

This invention relates to those machines which are designed to thread screw blanks.

In automatic wood screw machines the tool is fed and returned longitudinally of the blank several times for cutting each thread. At the beginning of the feed the tool is turned in toward the blank so as to cut and at the end of the feed the tool is turned out from the blank in order that it may be returned. Each following cut for the same thread must be deeper than the preceding cut. The longitudinal feed and return movements of the tool are controlled by a feed cam and the transverse cut and clearing movements of the tool are controlled by a cut or depth cam. It is necessary that the driving mechanism during each cycle of the machine cause the spindle that carries the screw blank to rotate a certain specified number of turns at a fixed speed; that it cause the tool to begin at the same locality and travel the same distance each feed; and that it cause the tool to turn in for cutting and out for clearing at the correct moments. In other words the blank, the feed cam and the depth cam must be rotated in consonance. This is acomplished by intermeshing gears, and these of course affect the same sequence of actions during each cycle of the machine.

The object of this invention is to so design the driving mechanism of a machine of this character that with a single tool, screw blanks may be provided with double threads of the required pitch and depth, both threads starting at the same distance from the points of the blanks.

This object is attained by so co-relating and proportioning the gearing for rotating the blank, the feed cam and the depth cam, that while the actions are synchronous and in regular sequence the blank spindle is rotated one-half of a turn extra on each return of the tool in order that the following cut shall begin diametrically opposite the beginning of the preceding cut.

In the accompanying drawings Figure 1 shows a side elevation of so much of an automatic wood screw machine as is necessary to an understanding of the invention. Fig. 2 shows a section on the plane indicated by the dotted line 2—2 on Fig. 1. Fig. 3 shows a face view of the driving gears arranged to accomplish the desired result.

In the embodiment of the invention illustrated the screw blank 1 is held in a chuck 2 that is mounted on a spindle 3 which is supported in bearings in the frame 4. Between the bearings the spindle has a driving pulley 5 and at the end opposite the chuck has a pinion 6.

The cutting tool is clamped to an arm 8 that is fastened to the feed shaft 9. The feed shaft is fed forward by the cam 10 which is fastened on a shaft 11 that is supported in bearings in the frame and on its end has a gear 12 and connected pinion 13.

Secured to and projecting forwardly from the feed shaft is an arm 14 fastened to the front end of which is a shoe 15. This shoe is held down to the profile cam 16 by a spring 17. The profile cam is adjustably mounted on a saddle 18 that turns in bearings in the frame 19 concentric with the feed shaft. Projecting rearwardly from the saddle is an arm 20 the free end of which is adapted to be engaged by the depth cam 21. The depth cam has cam surfaces 22 and intervening notches 23, and it is fastened on a shaft 24 that at the other end has a gear 25. When the cam surfaces 22 engage the end of the arm the saddle is swung up and the profile cam is lifted so as to turn the feed shaft and carry the point of the cutting tool in toward the blank. When the end of the arm drops into one of the notches 23 the spring 17 draws the saddle down and turns the feed shaft so that the cutting point of the tool is moved out from the blank. The depth cam illustrated is similar to that shown and described in U. S. Patent No. 1,196,308 issued on my application August 29th, 1916, the only difference being that in the machine shown in the patent each following cam surface is a little higher than the preceding cam surface so that each subsequent cut made by the tool is a little deeper than the preceding cut, while in the present case there are twice as many cam surfaces 22 and notches 23 in the cam, and each two of the cam surfaces are the same height so that there will be two succeeding feeds of the tool in which the cut is the same depth, the increase in depth coming only after two cuts of the same depth.

In the machine illustrated power applied to the driving pulley on the blank carrying spindle is transmitted from the pinion 6 through an idler gear 26 to the intermediate or change gear 27 which is connected with the pinion 28 that meshes with the gear 12 on the feed cam shaft. The pinion 13 on the feed cam shaft meshes with the idler gear 29 which engages with an intermediate gear 30 that is attached to a pinion 31 which meshes with the gear 25 on the depth cam shaft.

While the gears are so connected that they drive the feed and depth cams in synchronism with the rotation of the blank carrying spindle, the teeth of the change gear 27 and pinion 28 are so proportioned relatively to the teeth of the gears with which they mesh that the spindle makes a half turn extra for each feed of the cutting tool. In other words following each cut of the tool the blank is turned one-half of a revolution ahead of the interval at which the tool is turned in for cutting. As a result of this each cut is commenced one-half of a turn of the blank behind the preceding cut so that when two threads are cut they will begin the same distance from the point of the blank but on diametrically opposite sides. This is accomplished in this machine by the correct proportioning of the number of teeth in the change gear 27 and pinion 28 to the other gears with which they mesh.

The invention claimed is:—

1. An operating mechanism for a wood screw machine comprising a spindle, means for rotating the spindle, a shaft, means for feeding the shaft longitudinally, means for oscillating the shaft on its axis, and intermeshing gears between the spindle and the shaft reciprocating and oscillating means, said gears having such ratio that the spindle turns one-half of a revolution more than a full number of revolutions with relation to the reciprocations and oscillations of the shaft, whereby a tool carried by the shaft will start cutting a blank carried by the spindle alternately on diametrically opposite sides.

2. An operating mechanism for a wood screw machine comprising a spindle, means for rotating the spindle, a rotatory and reciprocatory shaft, a cam for feeding the shaft longitudinally, a cam and connections for oscillating the shaft axially, and intermeshing gears interposed between the spindle and said cams, said gears having such ratio that the spindle turns one-half of a revolution more than a full number of revolutions with relation to the reciprocations and oscillations of the shaft.

3. An operating mechanism for a wood screw machine comprising a rotatory blank spindle, means for rotating the spindle, a rotatory and reciprocatory tool feed shaft, a cam for feeding the shaft longitudinally, and intermeshing gears between the spindle and cam, said gears having such ratio that the spindle turns one-half of a revolution more than a full number of revolutions with relation to the revolutions of the cam.

4. An operating mechanism for a wood screw machine comprising a rotatory blank spindle, means for rotating the spindle, a rotatory and reciprocatory tool feed shaft, a cam for feeding the shaft longitudinally, and intermeshing gears between the spindle and cam, said gears having such ratio that there is a fractional difference between the relative rotations of the spindle and the feed cam.

5. An operating mechanism for a wood screw machine comprising a rotatory blank spindle, means for rotating the spindle, a rotatory and reciprocatory tool feed shaft, a cam for feeding the shaft longitudinally, and intermeshing gears including an idler and change gears interposed between the spindle and the cam, said change gears having such a number of teeth that the spindle turns a number of full revolutions and a fraction of a revolution more to one revolution of the cam.

6. An operating mechanism for a wood screw machine comprising a rotatory blank spindle, means for rotating the spindle, a rotatory and reciprocatory tool feed shaft, a cam for feeding the shaft longitudinally, and intermeshing gears including an idler and a change gear and pinion having such ratio to each other and to the gears with which they mesh that the spindle turns a number of complete revolutions and one-half more to each complete revolution of the cam.

7. An operating mechanism for a wood screw machine comprising a rotatory blank spindle, means for rotating the spindle, a rotatory and reciprocatory tool feed shaft, a cam for feeding the shaft longitudinally, a swinging profile cam for oscillating the shaft axially, a cut cam for swinging the profile cam, and intermeshing gears between the spindle and the feed and cut cams for driving them synchronously, said gears having such ratio that the spindle turns a number of full revolutions and a fraction more for each action of said cams.

HENRY L. SMITH.